United States Patent
Baek et al.

(10) Patent No.: US 7,315,433 B2
(45) Date of Patent: Jan. 1, 2008

(54) NON-REPEATABLE RUN OUT COMPENSATING APPARATUS AND METHOD AND DISC DRIVE USING THE SAME

(75) Inventors: Sang-eun Baek, Incheon-si (KR); Jun-seok Shim, Seongnam-si (KR); Chang-ik Kang, Jeju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/268,448

(22) Filed: Nov. 8, 2005

(65) Prior Publication Data

US 2006/0114602 A1 Jun. 1, 2006

(30) Foreign Application Priority Data

Dec. 1, 2004 (KR) ...................... 10-2004-0099740

(51) Int. Cl.
*G11B 5/596* (2006.01)

(52) U.S. Cl. ............................... 360/78.09; 360/78.04; 360/77.02

(58) Field of Classification Search ..................... None
See application file for complete search history.

(56) References Cited

U.S. PATENT DOCUMENTS

| | | | |
|---|---|---|---|
| 6,618,219 B1 * | 9/2003 | Ho | 360/77.04 |
| 6,628,472 B1 * | 9/2003 | Ho | 360/77.04 |
| 6,636,376 B1 * | 10/2003 | Ho | 360/77.02 |
| 6,768,607 B2 * | 7/2004 | Ottesen et al. | 360/77.02 |
| 6,771,144 B2 * | 8/2004 | Takamine | 333/133 |
| 6,922,596 B2 * | 7/2005 | Erickson et al. | 700/54 |
| 7,016,142 B2 * | 3/2006 | Jung et al. | 360/77.02 |

* cited by examiner

*Primary Examiner*—K. Wong
(74) *Attorney, Agent, or Firm*—Sughrue Mion, Pllc.

(57) ABSTRACT

An apparatus and method are provided for quickly and finely compensating for non-repeatable run out (NPRO) of a disc drive. The NPRO compensation control apparatus in a run out compensation apparatus of a system includes: a frequency estimator directly estimating a trigonometric function value of an NRRO frequency from a predetermined signal responding to the system using a correlation between a filter coefficient of a notch filter and a notch frequency; and an NRRO compensator canceling NRRO of the system using the trigonometric function value of the NRRO frequency estimated by the frequency estimator.

19 Claims, 6 Drawing Sheets

NON-REPEATABLE RUN OUT COMPENSATING APPARATUS AND METHOD AND DISC DRIVE USING THE SAME

CROSS-REFERENCE TO RELATED PATENT APPLICATION

This application claims priority from Korean Patent Application No. 10-2004-0099740, filed on Dec. 1, 2004, in the Korean Intellectual Property Office, the disclosure of which is incorporated herein in its entirety by reference.

BACKGROUND OF THE INVENTION

1. Field of the Invention

Apparatuses and methods consistent with the present invention relate to disc drive servo control, and more particularly, to quickly and finely compensating for non-repeatable run out (NRRO) of a disc drive.

2. Description of the Related Art

Hard disc drives (HDDs) data storage devices which reproduce data recorded on a disc or write data on a disc using a magnetic head. According to the trend for making high capacity, high density, and compact HDDs, a number of bits per inch (BPI), which denotes a recording density in a disc rotating direction, and a number of tracks per inch (TPI), which denotes the recording density in a disc diameter direction, have been increased. Accordingly, a more elaborate operation mechanism is required for the HDDs.

A purpose of a track following control in an HDD is to place a head on the very center of a target track even if run out exists. The run out is classified into repeatable run out (RRO) generated due to disc eccentricity and non-repeatable run out (NRRO) generated due to disc fluttering. Here, "repeatable" means that a phase of a run out signal is synchronized with a servo sector of a disc. While research related to RRO compensation control has been briskly carried out, research related to NRRO compensation control has not that briskly been carried out due to technical difficulties.

The technical difficulties of the NRRO compensation control can be mainly classified as (1) a frequency of the run out signal varies according to products; and (2) a phase of the run out signal cannot be synchronized with the disc servo sector. It is difficult to develop a quick and fine NRRO compensation controller because of these two eigen characteristics of the NRRO.

When a rotational speed of a disc is increased to improve an operational speed of the HDD, a disc fluttering effect is severely generated, the NRRO is increased, and a disc servo performance is degraded.

U.S. Pat. No. 5,072,318 discloses a method of compensating for the NRRO by estimating a frequency, amplitude, and phase of the NRRO from a position error signal (PES) as described below.

An NRRO value $X_{NRRO}(n)$ of an HDD can be represented as follows in Equation 1.

$$x_{NRRO}(n) = A(n)\cos(\omega(n)nT + \phi(n)) \quad (1)$$

To compensate for the NRRO, an estimating equation represented as follows in Equation 2 is used.

$$a(n+1) = a(n) + \mu \cos(\omega(n)nT)x_{PES}(n)$$

$$b(n+1) = b(n) + \mu \sin(\omega(n)nT)x_{PES}(n)$$

$$\omega(n+1) = \omega(n) + \mu nT[b(n)\cos(\omega(n)nT) - a(n)\sin(\omega(n)nT)]$$
$$x_{PES}(n) \quad (2)$$

A compensation value according to the estimation result is represented as follows in Equation 3.

$$u(n) = a(n)\cos(\omega(n)nT) + b(n)\sin(\omega(n)nT) \quad (3)$$

According to the conventional technology, since a frequency value $\omega(n)$ is estimated in the estimating equation, estimation stability and convergence speed are degraded. Also, since a trigonometric function value $\sin(\omega(n)nT)$ of an estimated frequency is necessary to compensate for the NRRO, an exact realization is difficult.

U.S. Pat. No. 6,636,376 discloses a method for compensating for the NRRO by canceling a resonance frequency of a disc drive. In particular, U.S. Pat. No. 6,636,376 discloses a method of estimating a frequency in off-line using discrete Fourier transform (DFT) and using the estimation result in an NRRO compensator. However, when the frequency varies along time, performance is degraded. In addition, when the NRRO compensation is realized, calculation of the trigonometric function is still necessary.

SUMMARY OF THE INVENTION

The present invention provides an NRRO compensation control apparatus and method for compensating for NRRO by directly estimating a $\cos(\omega T)$ value required when the NRRO is realized in only a band in which NRRO detection is predicted, and a disc drive using the same.

According to an aspect of the present invention, there is provided an NRRO compensation control apparatus in a run out compensation apparatus of a system, the apparatus comprising: a frequency estimator directly estimating a trigonometric function value of an NRRO frequency from a predetermined signal responding to the system using a correlation between a filter coefficient of a notch filter and a notch frequency; and an NRRO compensator canceling NRRO of the system using the trigonometric function value of the NRRO frequency estimated by the frequency estimator.

According to another aspect of the present invention, there is provided an NRRO compensation control method in a run out compensation method of a system, the method comprising: directly estimating a trigonometric function value of an NRRO frequency from a predetermined signal responding to the system; and (b) compensating for NRRO of the system using the estimated trigonometric function value of the NRRO frequency.

According to another aspect of the present invention, there is provided a disc drive in a data storage system, the disc drive comprising: a state estimator estimating a state information value of head motion including head position, velocity, and control input information from a position error signal (PES); a state feedback controller generating state feedback control information obtained by multiplying the state information value by a predetermined state feedback gain; an NRRO compensation circuit directly estimating a trigonometric function value of an NRRO frequency from the PES and generating NRRO compensation information corresponding to the estimated trigonometric function value of the NRRO frequency; an adder adding the NRRO compensation information to the state feedback control information; and a voice coil motor (VCM) drive and actuator moving a head by generating a driving current corresponding to an output of the adder and generating the PES.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

An HDD is constituted of a head disc assembly (HDA), which is comprised of mechanical components, and an electrical circuit.

Figure 1:
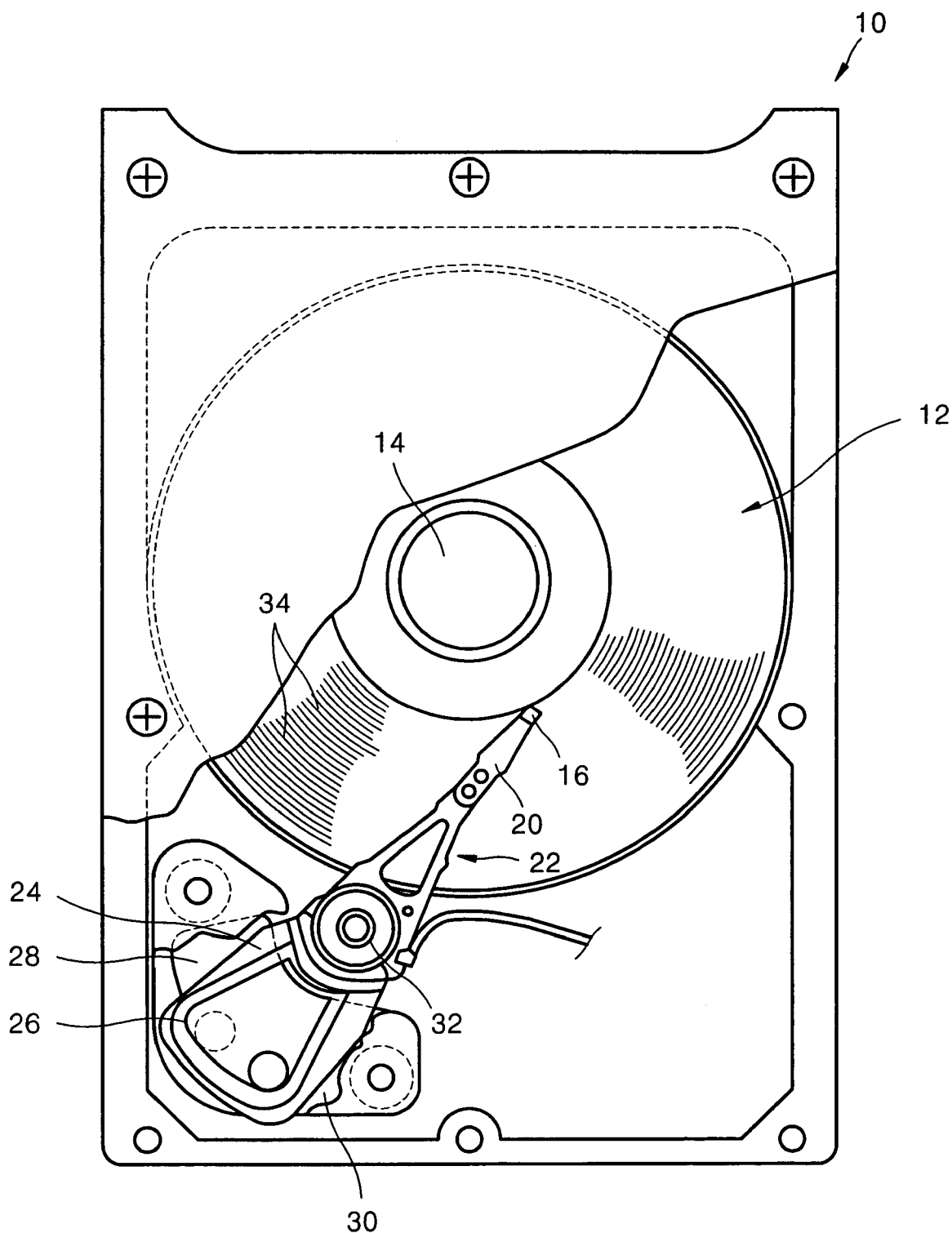
FIG. 1 is a schematic top view of an HDA of an HDD to which an exemplary embodiment of the present invention is applied.

FIG. 1 is a schematic top view of an HDA 10 of an HDD to which an exemplary embodiment of the present invention is applied. Referring to FIG. 1, the HDA 10 includes at least one magnetic disc 12 rotated by a spindle motor 14. The HDA 10 also includes a transducer (not shown) adjacently located on a disc surface.

The transducer can read or write information from or on the rotating disc 12 by sensing a magnetic field formed on the disc 12 or magnetizing the disc 12. Typically, the transducer is associated with each disc surface. Though a single transducer is shown in FIG. 1, the transducer includes a write transducer which magnetizes the disc 12 and a read transducer which senses a magnetic field of the disc 12. The read transducer is composed of a magneto-resistive (MR) component.

The transducer can be incorporated into a head 16. The head 16 generates an air bearing between the transducer and the disc surface. The head 16 is incorporated into a head stack assembly (HSA) 22. The HSA 22 is attached to an actuator arm 24 having a voice coil 26. The voice coil 26 is located adjacent to a magnetic assembly 28 to define a voice coil motor (VCM) 30. A current supplied to the voice coil 26 generates a torque which rotates the actuator arm 24 around a bearing assembly 32. The rotation of the actuator arm 24 moves the transducer across the disc surface.

Information is stored in annular tracks of the disc 12. In general, each track 34 includes a plurality of sectors. Each sector includes a data field and an identification field. The identification field is comprised of a Gray code for identifying a sector and a track (cylinder). The transducer moves across the disc surface in order to read information from or write information on another track.

Figure 2:
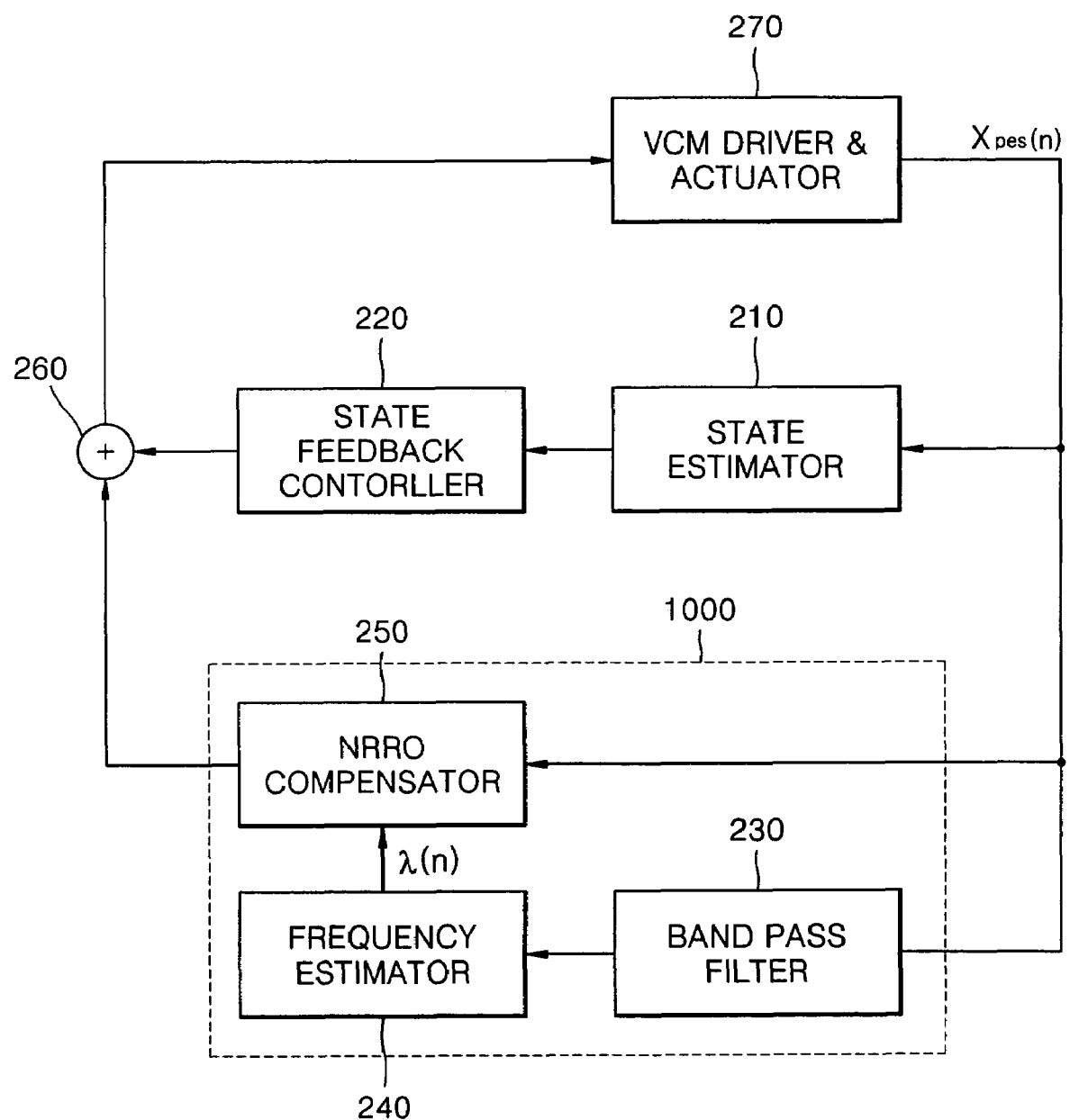
FIG. 2 is a block diagram of a servo control circuit of the HDD to which an NRRO compensation control apparatus according to an exemplary embodiment of the present invention is applied.

FIG. 2 is a block diagram of a servo control circuit of the HDD to which an NRRO compensation control apparatus according to an exemplary embodiment of the present invention is applied.

Referring to FIG. 2, the servo control circuit of the HDD includes a state estimator 210, a state feedback controller 220, an NRRO compensation circuit 1000, a summing unit 260, and a VCM driver and actuator 270.

The NRRO compensation circuit 1000 includes a band pass filter 230, a frequency estimator 240, and an NRRO compensator 250.

The state estimator 210 performs a process for estimating a state variable value of head motion including head position, velocity, and control input information from a position error signal (PES) $x_{PES}(n)$ using a state equation.

The state feedback controller 220 generates a state feedback control value obtained by multiplying the state variable value of the head motion estimated by the state estimator 210 by a state feedback gain.

The band pass filter 230 determines a frequency characteristic so as to pass a PES of a frequency band in which it is possible for the NRRO to be generated. For example, the band pass filter 230 can be designed to have a response characteristic $H_{BPF}(Z)$ as shown in Equation 4.

$$H_{BPF}(z) = K \frac{z^2 - 1}{z^2 - 2r\cos(\omega_c T)z + r^2} \quad (4)$$

Here, $\omega_c$ denotes a center frequency, r determines a bandwidth, and K is a constant to match a center frequency gain to 1 and is determined as Equation 5.

$$K = \frac{(1-r)\sqrt{r^2 - 2r\cos(2\omega_c T) + 1}}{\sqrt{2[1 - \cos(2\omega_c T)]}} \quad (5)$$

Figure 4:
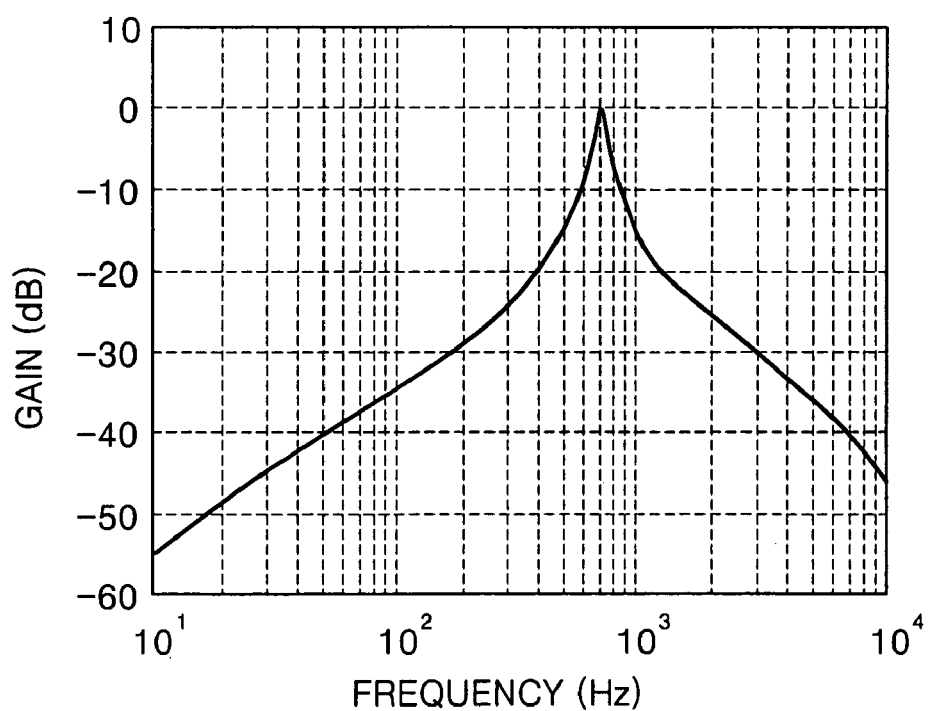
FIG. 4 is a diagram illustrating a frequency response characteristic of a band pass filter applied to an exemplary embodiment of the present invention.

An example of a frequency response characteristic of the band pass filter 230 whose center frequency is 700 Hz is shown in FIG. 4.

The PES includes components due to a variety of run out and noise besides the NRRO component, and the band pass filter 230 increases accuracy of NRRO frequency estimation.

The NRRO compensator 250 is designed according to a well-known control model such as Equation 6 with respect to an NRRO frequency $\omega$.

$$\begin{bmatrix} x_1(n+1) \\ x_2(n+1) \end{bmatrix} = \quad (6)$$

$$\begin{bmatrix} 2\cos(\omega T) & 1 \\ -1 & 0 \end{bmatrix} \begin{bmatrix} x_1(n) \\ x_2(n) \end{bmatrix} + \begin{bmatrix} \alpha \\ \beta \end{bmatrix} x_{PES}(n) u_{com}(n) = \begin{bmatrix} 1 & 0 \end{bmatrix} \begin{bmatrix} x_1(n) \\ x_2(n) \end{bmatrix}$$

A transfer function of the NRRO compensator 250 is represented as Equation 7 where two pole points $e^{\pm j\omega}$ correspond to the NRRO frequency $\omega$.

$$H_{NRRO}(z) = \frac{\alpha z + \beta}{z^2 - 2\cos(\omega T)z + 1} \quad (7)$$

Since the NRRO frequency varies according to using conditions and products, accurate estimation is necessary. In the present exemplary embodiment, a coefficient $\cos(\omega T)$ of the NRRO compensator 250 can vary as Equation 8 according to frequency estimation results.

$$\begin{bmatrix} x_1(n+1) \\ x_2(n+1) \end{bmatrix} = \begin{bmatrix} 2\lambda(n) & 1 \\ -1 & 0 \end{bmatrix} \begin{bmatrix} x_1(n) \\ x_2(n) \end{bmatrix} + \begin{bmatrix} \alpha \\ \beta \end{bmatrix} x_{PES}(n) u_{com}(n) = [1 \ 0] \begin{bmatrix} x_1(n) \\ x_2(n) \end{bmatrix} \quad (8)$$

A method of directly estimating the coefficient $\cos(\omega T)$ used by the NRRO compensator 250 will now be described in detail.

The frequency estimator 240 performs a function of accurately estimating the trigonometric function value of the NRRO frequency from the PES.

Figure 3:
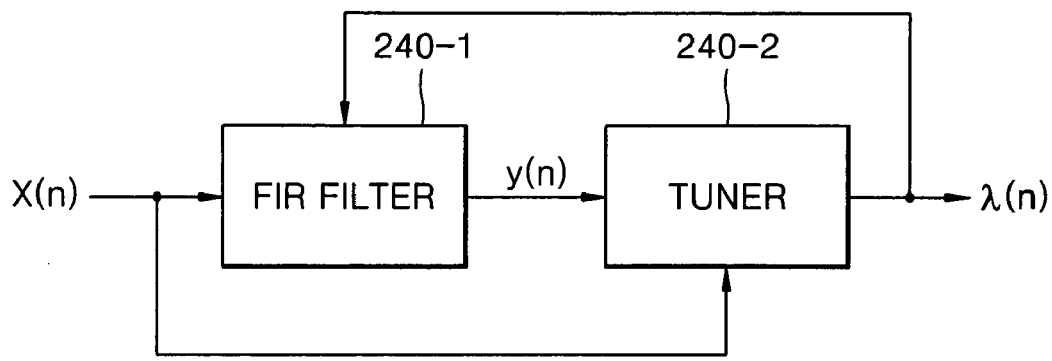
FIG. 3 is a block diagram of a frequency estimator shown in FIG. 2.

For example, the frequency estimator 240 can be comprised of a variable coefficient finite impulse response (FIR) filter 240-1 and a tuner 240-2 shown in FIG. 3.

A characteristic equation of the variable coefficient FIR filter 240-1 is shown in Equation 9.

$$y(n) = x(n) - 2\lambda(n)x(n-1) + x(n-2) \quad (9)$$

According to a frequency response characteristic thereof, the FIR filter 240-1 is a notch filter, and a notch frequency is determined by a filter coefficient $\lambda(n)$. If $\lambda(n) = \cos(\omega T)$, since a filter zero point is $e^{\pm j\omega}$ by Equation 8, a correlation between the filter coefficient and the notch frequency is obtained by $\lambda(n) = \cos(\omega T)$. Therefore, if a frequency of a filter input signal is equal to the center frequency of the notch filter, an output of the filter approaches to zero. Using this factor on the contrary, adjustment of the filter coefficient in a direction where the filter output is minimized causes the filter coefficient value to converge the value $\cos \omega T$ corresponding to the frequency of the filter input signal.

Using this feature, the tuner 240-2 is designed to adjust the filter coefficient $\lambda(n)$ in a direction where an output of the FIR filter 240-1 is minimized. Accordingly, a filter coefficient adjustment equation of the tuner 240-2 for minimizing the output of the FIR filter 240-1 is designed as Equation 10 based on a well-known least mean square (LMS) theory.

$$\lambda(n+1) = \lambda(n) + \mu\, y(n)x(n-1) \quad (10)$$

Here, variables $x(n)$ and $y(n)$ denote input and output signals of the FIR filter 240-1, respectively, and a constant $\mu$ denotes an adaptation gain.

If the filter coefficient is adjusted in this way, the filter coefficient $\lambda(n)$ converges into a value corresponding to the NRRO frequency as shown in FIG. 11.

$$\lambda(n) \rightarrow \cos(\omega T) \quad (11)$$

Therefore, the frequency estimator 240 does not estimate the NRRO frequency value $\omega(n)$ as in a conventional technology but instead directly estimates the value $\cos(\omega T)$ required for the NRRO compensator 250.

If the filter coefficient $\lambda(n)$ corresponding to the estimated trigonometric function value $\cos(\omega T)$ of the NRRO frequency is input to the NRRO compensator 250, an NRRO compensation value $u_{com}(n)$ can be quickly calculated using Equation 8.

In the present invention, it is effective that the frequency estimator 240 is designed to be initialized with a pre-known normal state value in order to improve a frequency estimation speed.

The summing unit 260 adds the state feedback control value output from the state feedback controller 220 to the NRRO compensation value output from the NRRO compensator 250 and outputs the summation result to the VCM driver and actuator 270.

The VCM driver and actuator 270 moves a head by generating a driving current corresponding to an output of the summing unit 260 and generates the PES corresponding to the head motion while performing track seeking and track following.

Experimental results showing that the NRRO can be quickly and finely compensated by using the NRRO compensation method suggested in the present invention are illustrated below.

An HDD having a track density of 130,000 TPI, a track width of 0.19 μm, and disc rotation speed of 7,200 rpm was used for the experiments. An NRRO having a frequency of 800 Hz and an amplitude of 0.5 tracks was input to a control system, and the NRRO compensation circuit was set to begin its operation in a track following mode.

Figure 5:
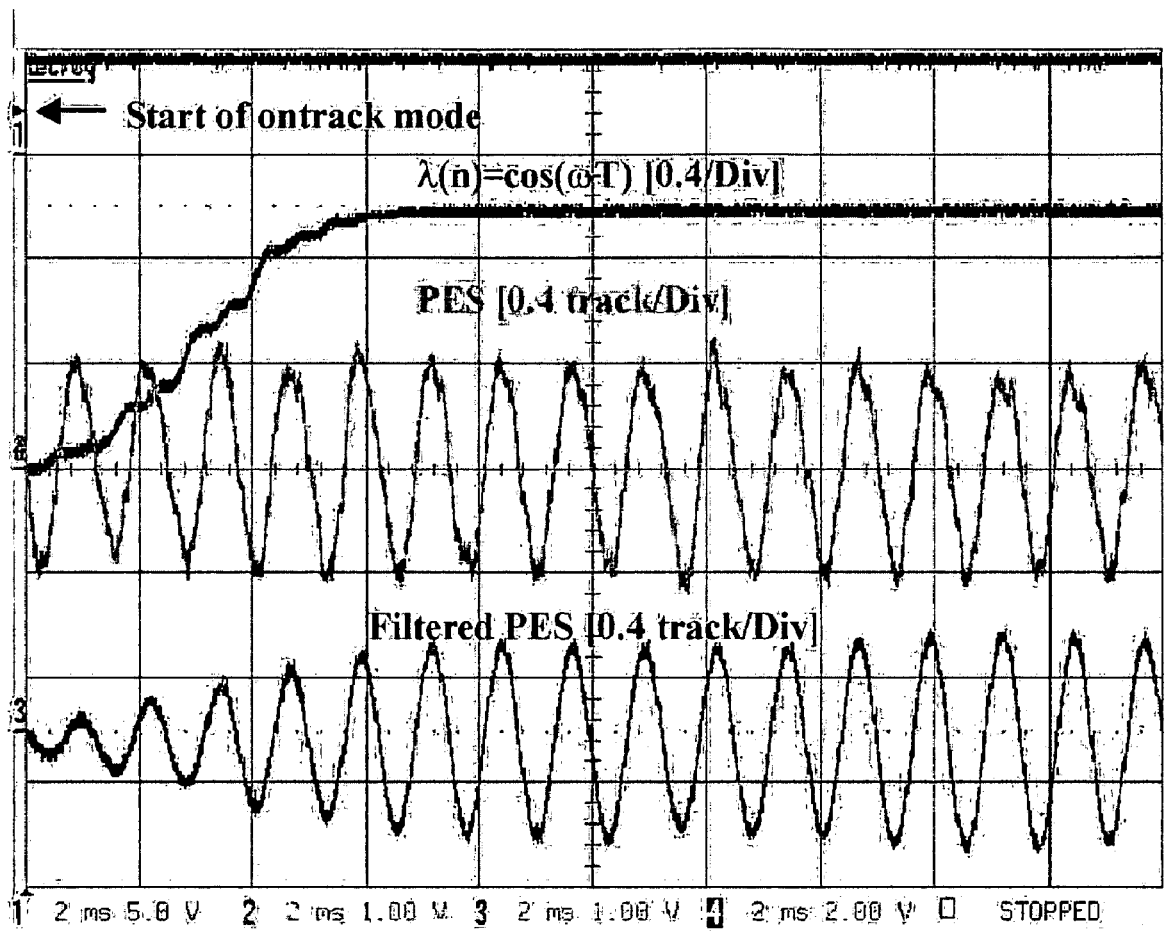
FIG. 5 is a diagram illustrating frequency estimation and PES performances when the frequency estimator is turned on and an NRRO compensator is turned off in order to describe effects of the present invention.

FIG. 5 is a diagram illustrating frequency estimation and PES performances when the frequency estimator 240 is turned on and the NRRO compensator 250 is turned off. Referring to FIG. 5, a PES by 0.4 tracks is generated due to the NRRO. However, a frequency estimation value begins at 0 and exactly converges into a value corresponding to 800 Hz. The convergence time is around 6 msec.

Figure 6:
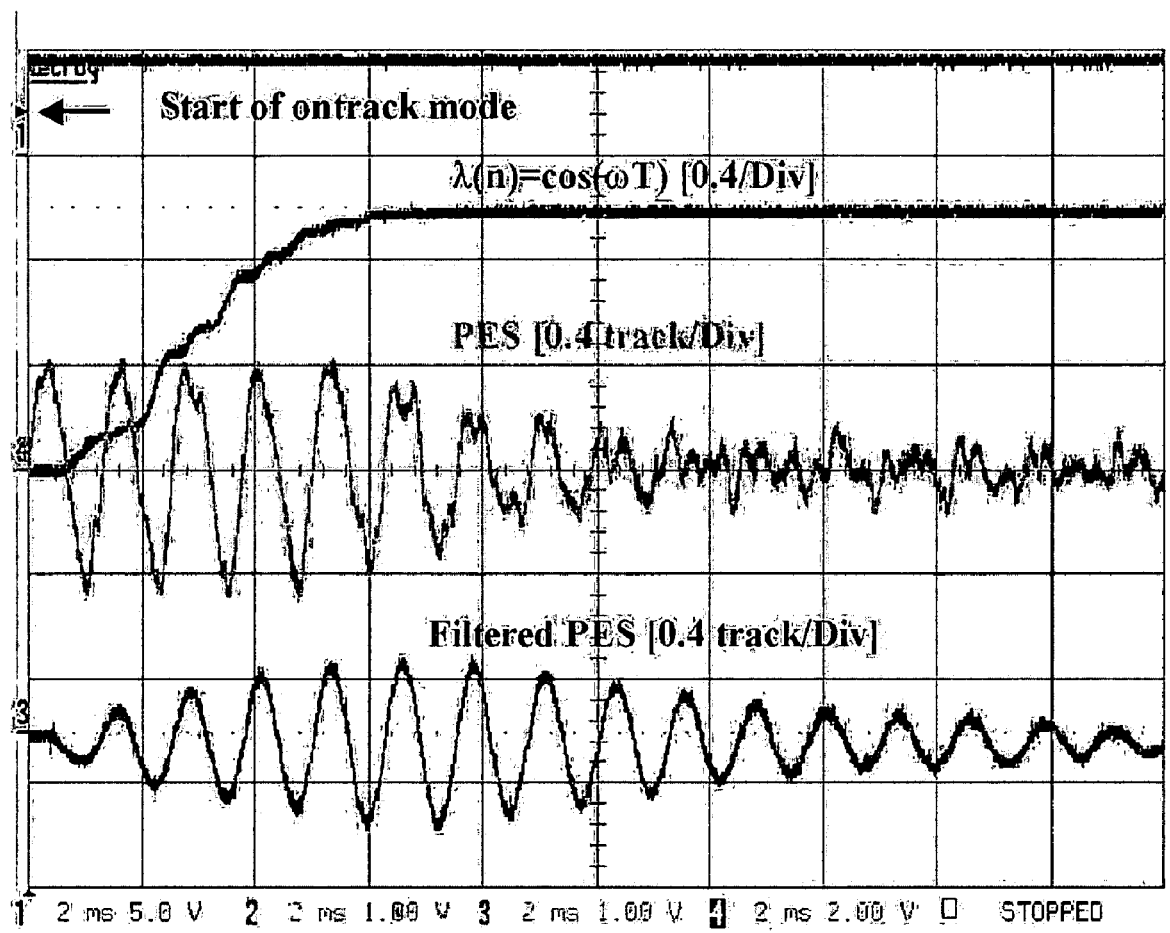
FIG. 6 is a diagram illustrating the frequency estimation and PES performances when the frequency estimator and NRRO compensator are turned on in order to describe effects of the present invention.

FIG. 6 is a diagram illustrating the frequency estimation and PES performances after the NRRO compensator 250 is turned on. Referring to FIG. 6, an initial value of the frequency estimator 240 is set to 0. A frequency accurately converges within 6 msec, and a PES converges into a value near 0 within 10 msec.

Figure 7:
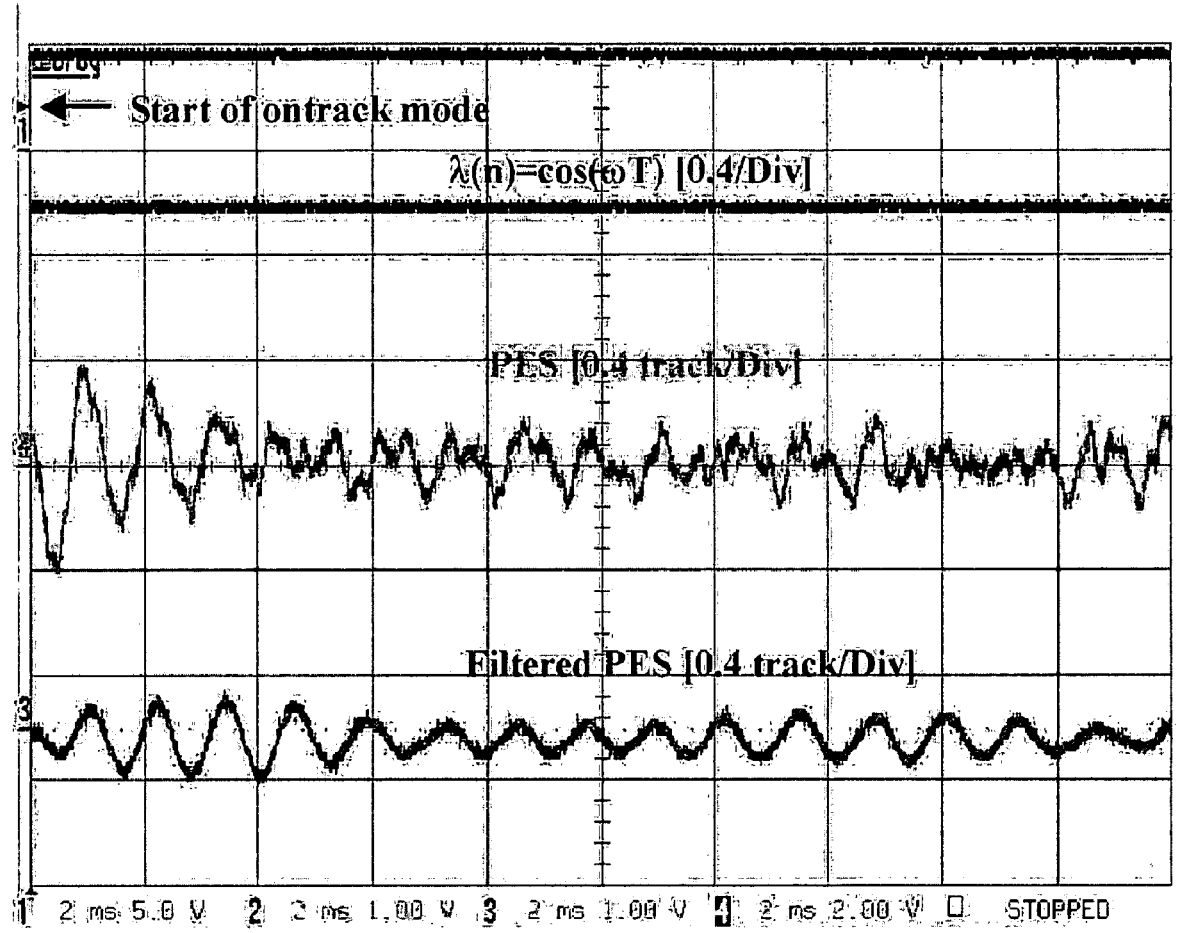
FIG. 7 is a diagram illustrating a performance when the frequency estimator begins from a pre-known normal state value in order to describe effects of the present invention.

FIG. 7 is a diagram illustrating a performance when the frequency estimator 240 begins at a pre-known normal state value in order to reduce the NRRO compensation time. Referring to FIG. 7, the NRRO compensation time is reduced within 4 msec. Therefore, in the NRRO compensation method according to the present invention, the NRRO can be compensated more quickly and finely than the conventional technology.

As described above, according to exemplary embodiments of the present invention, by compensating for NRRO by directly estimating a $\cos(\omega T)$ value required when the NRRO is realized in only a frequency band in which NRRO detection is predicted, the NRRO can be compensated more quickly and finely than the conventional technology.

The present invention can be realized as a method, an apparatus, and/or a system. When the present invention is realized as software, components of the present invention are embodied as code segments for executing required operations. A program or the code segments can be stored in a processor readable recording medium and transmitted as computer data signals combined with a carrier using a transmission medium or a communication network. The processor readable recording medium is any data storage device that can store or transmit data which can be thereafter read by a computer system. Examples of the processor readable recording medium include electronic circuits, semiconductor memory devices, read-only memory (ROM), flash memory, erasable ROM, floppy disks, optical discs, hard discs, optical fiber media, and RF networks. The computer data signals include any signal which can be propagated via transmission media such as electronic network channels, optical fibers, air, electronic fields, radio frequency (RF) networks.

While the present invention has been particularly shown and described with reference to exemplary embodiments thereof, it will be understood by those skilled in the art that various changes in form and details may be made therein without departing from the spirit and scope of the invention as defined by the appended claims. The above-described exemplary embodiments should be considered in a descriptive sense only and are not for purposes of limitation. Therefore, the scope of the invention is defined not by the detailed description of the invention but by the appended claims, and all differences within the scope will be construed as being included in the present invention.

What is claimed is:

1. A non-repeatable run out (NRRO) compensation control apparatus in a run out compensation apparatus of a system, the apparatus comprising:
   a frequency estimator which directly estimates a trigonometric function value of an NRRO frequency from a predetermined signal responding to the system using a correlation between a filter coefficient of a notch filter and a notch frequency; and
   an NRRO compensator which cancels NRRO of the system using the trigonometric function value of the NRRO frequency estimated by the frequency estimator.

2. The apparatus of claim 1, wherein the predetermined signal includes a position error signal (PES) generated according to head motion of a disc drive.

3. The apparatus of claim 1, further comprising a band pass filter which inputs the predetermined signal, passes only a band component in which it is possible for the NRRO to be generated, and outputs the band component to the frequency estimator.

4. The apparatus of claim 1, wherein the frequency estimator is initialized with a pre-known normal state value when starting.

5. The apparatus of claim 1, wherein the frequency estimator comprises:
   a finite impulse response (FIR) filter which filters the predetermined signal according to a predetermined frequency response characteristic; and
   a tuner which inputs an output of the FIR filter and outputs a converged filter coefficient value while adjusting the filter coefficient in a direction where the output of the FIR filter is minimized.

6. The apparatus of claim 5, wherein a characteristic equation of the FIR filter is $$y(n) = x(n) - 2\lambda(n)x(n-1) + x(n-2)$$

where x(n) and y(n) are input and output signals of the FIR filter, respectively, and λ(n) is the filter coefficient.

7. The apparatus of claim 5, wherein the FIR filter is a notch filter.

8. The apparatus of claim 5, wherein the tuner adjusts the filter coefficient so that an output of the FIR filter is minimized using $$\lambda(n+1) = \lambda(n) + \mu y(n)x(n-1)$$

where λ(n) is the filter coefficient, x(n) and y(n) are input and output signals of the FIR filter, respectively, and μ is an adaptive gain constant.

9. A non-repeatable run our (NRRO) compensation control method in a run out compensation method of a system, the method comprising:
   directly estimating a trigonometric function value of an NRRO frequency from a predetermined signal responding to the system using a correlation between a filter coefficient of a notch filter and a notch frequency; and
   compensating for NRRO of the system using the trigonometric function value of the NRRO frequency which is estimated.

10. The method of claim 9, wherein the predetermined signal includes a position error signal (PES) generated according to head motion of a disc drive.

11. The method of claim 9, wherein the predetermined signal is a band-pass-filtered signal including only a frequency band component in which it is possible for the NRRO to be generated.

12. The method of claim 9, wherein the trigonometric function value of the NRRO frequency is estimated with a convergence value of a filter coefficient adjusted to minimize an output signal of a variable coefficient finite impulse response (FIR) filter using the variable coefficient FIR filter.

13. A disc drive in a data storage system, the disc drive comprising:
   a state estimator which estimates a state information value of head motion including head position, velocity, and control input information from a position error signal (PES);
   a state feedback controller which generates state feedback control information obtained by multiplying the state information value by a predetermined state feedback gain;
   a non-repeatable run out (NRRO) compensation circuit which directly estimates a trigonometric function value of an NRRO frequency from the PES using a correlation between a filter coefficient of a notch filter and a notch frequency and generates NRRO compensation information corresponding to the estimated trigonometric function value of the NRRO frequency;
   a summing unit which adds the NRRO compensation information to the state feedback control information; and
   a voice coil motor (VCM) driver and actuator which moves a bead by generating a driving current corresponding to an output of the summing unit and generates the PES.

14. The disc drive of claim 13, wherein the NRRO compensation circuit comprises:
   a band pass filter which inputs the PES and passes only a frequency band component in which it is possible for the NRRO to be generated;
   a frequency estimator which directly estimates the trigonometric function value of the NRRO frequency from an output of the band pass filter; and
   an NRRO compensator which generates the NRRO compensation information using the trigonometric function value of the NRRO frequency estimated by the frequency estimator.

15. The disc drive of claim 14, wherein the frequency estimator is initialized with a pre-known normal state value when starting.

16. The disc drive of claim 14, wherein the frequency estimator comprises:
   a finite impulse response (FIR) filter which filters an output of the band pass filter according to a predetermined frequency response characteristic; and a tuner which inputs an output of the FIR filter and outputs a converged filter coefficient value while adjusting the filter coefficient in a direction where the output of the FIR filter is minimized.

17. The disc drive of claim 16, wherein a characteristic equation of the FIR filter is $$y(n)=x(n)-2\lambda(n)x(n-1)+x(n-2)$$

where x(n) and y(n) are input and output signals of the FIR filter, respectively, and $\lambda(n)$ is the filter coefficient.

18. The apparatus of claim 16, wherein the FIR filter is a notch filter.

19. The disc drive of claim 16, wherein the tuner adjusts the filter coefficient so that an output of the FIR filter is minimized using $$\lambda(n+1)=\lambda(n)+\mu y(n)x(n-1)$$

where $\lambda(n)$ is the filter coefficient, x(n) and y(n) are input and output signals of the FIR filter, respectively, and $\mu$ is an adaptive gain constant.

* * * * *